J. A. LEMÉTAIS.
VALVE COCK.
APPLICATION FILED JAN. 25, 1910.

975,440.

Patented Nov. 15, 1910.

Witnesses:
Anton W. Selander.
E. K. Bond

Inventor
Julien A. Lemétais
by F. Dittmar
Attorney.

UNITED STATES PATENT OFFICE.

JULIEN ALBERT LEMÉTAIS, OF PARIS, FRANCE.

VALVE-COCK.

975,440.	Specification of Letters Patent.	Patented Nov. 15, 1910.

Application filed January 25, 1910. Serial No. 540,032.

*To all whom it may concern:*

Be it known that I, JULIEN ALBERT LEMÉTAIS, of 76 Avenue Daumesnil, in Paris, France, have invented certain new and useful Improvements in Valve-Cocks, of which the following is a specification.

The present invention has for its object to obtain a cock with valves, which can be used to mix two liquids, the particulars of the said cock being described in the following specification, reference being had to the annexed drawing.

Figure 1:
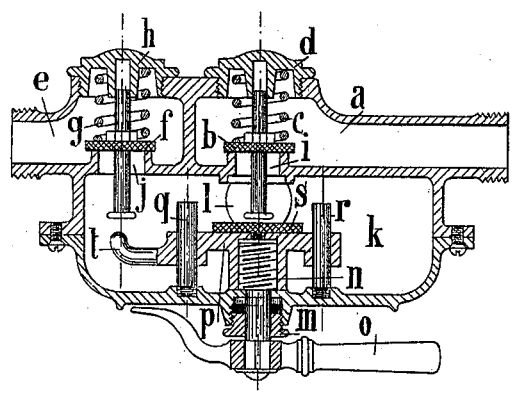
Figure 2:
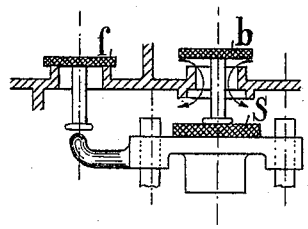
Figure 3:
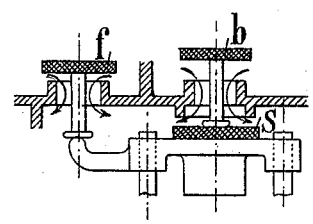
Figure 4:
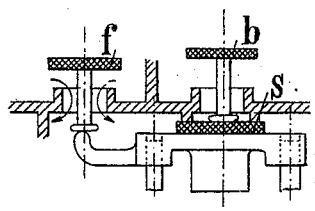

Figure 1 is a horizontal section through the axis of the apparatus, in the closed position. Figs. 2, 3 and 4 show, through the play of the valves, the distribution of the cold water alone, the distribution of the mixed water and the distribution of the hot water alone.

The improved cock is composed of a chamber ($a$) for the cold water, controlled by the valve ($b$), pressed on its seat by means of the spring ($c$) and closed by the stopper ($d$); of a chamber ($e$) for the hot water, controlled by the valve ($f$), pressed on its seat by means of the spring ($g$) and closed by the stopper ($h$). The said chambers are placed near one another, and they are connected by their conduits ($i$) and ($j$) with a chamber ($k$) which is used for the discharge of the waters through its discharge conduit ($l$). The said disposition aside from the easiness with which the dismounting and the regulating of the valves may be executed, presents the advantage of having the water under pressure upon each of the valves and to prevent thus any running out at the cock. The water under pressure does not act therefore on the stuffing-box ($m$) which is traversed by the screw ($n$) worked by means of the handle ($o$) for the working of the valves. The said screw ($n$) is connected with and operates a piece $p$ which is guided freely and in a right line direction by the shafts $q$ and $r$, to work directly on the valve for the cold water by the medium of its disk ($s$), and by its end ($t$) on the valve for the hot water.

The working of the improved apparatus is as follows: When the screw ($n$) is operated, the disk ($s$) pushes the valve ($b$) of the tank for the cold water away from its seat, permitting the said cold water to run into the chamber ($k$). If the said movement is continued, the end ($t$) of the piece ($p$) engages and pushes the valve ($f$) of the tank for the hot water away from its seat. At this moment, the mixing of the two waters is effected and the temperature is increased as the screw advances, the disk ($s$) gradually closing the conduit $i$ and decreasing the quantity of cold water passing into the chamber $k$, while the valve for the hot water is, during the same period of time, gradually opened more and more until by the complete closing of the said conduit, the distribution of the hot water only is caused. The working of the screw in the opposite direction causes the valves $b$ and $f$ to be forced upon their seats to shut off the flow of water into the tank $k$. The advantage of the said improved disposition is that it permits the distribution of the cold water first, and afterward the distribution of the hot water, to obtain the mixture, as well as the distribution of the hot water alone.

The disposition of the tanks for the hot and cold water may be inverted, if the hot water is desired to be distributed first. Likewise, the system composed of a disk controlling the one conduit, combined with means for the working of the valve of the opposite conduit, may be substituted in practice by any other mechanical medium than the means specified as being one of the best practical executions of the object of the present invention.

The several positions of the valves during the working of the apparatus are shown in Figs. 2, 3 and 4.

What I claim is:

1. In a cock for mixing liquids, a mixing chamber, valves controlling ports for hot and cold water, a piece working first on the valve controlling the port for the cold water and working afterward on the valve controlling the port for the hot water to cause the mixing of the two waters, a disk, the progressive interception of the cold water being caused by means of said disk whereby there may be the distribution of the hot water alone.

2. Chambers one for hot water and the other for cold water, valves for said chambers, a plate movably guided, means for moving said plate, and a lateral extension on said plate out of the plane of said plate to contact with the stem of one of said
5 valves by continuous movement of said plate after the latter has moved the other valve.

In testimony whereof I affix my signature.

JULIEN ALBERT LEMÉTAIS.

In presence of—
  VICTOR PRÉVOST,
  DEAN B. MASON.